Patented May 20, 1930

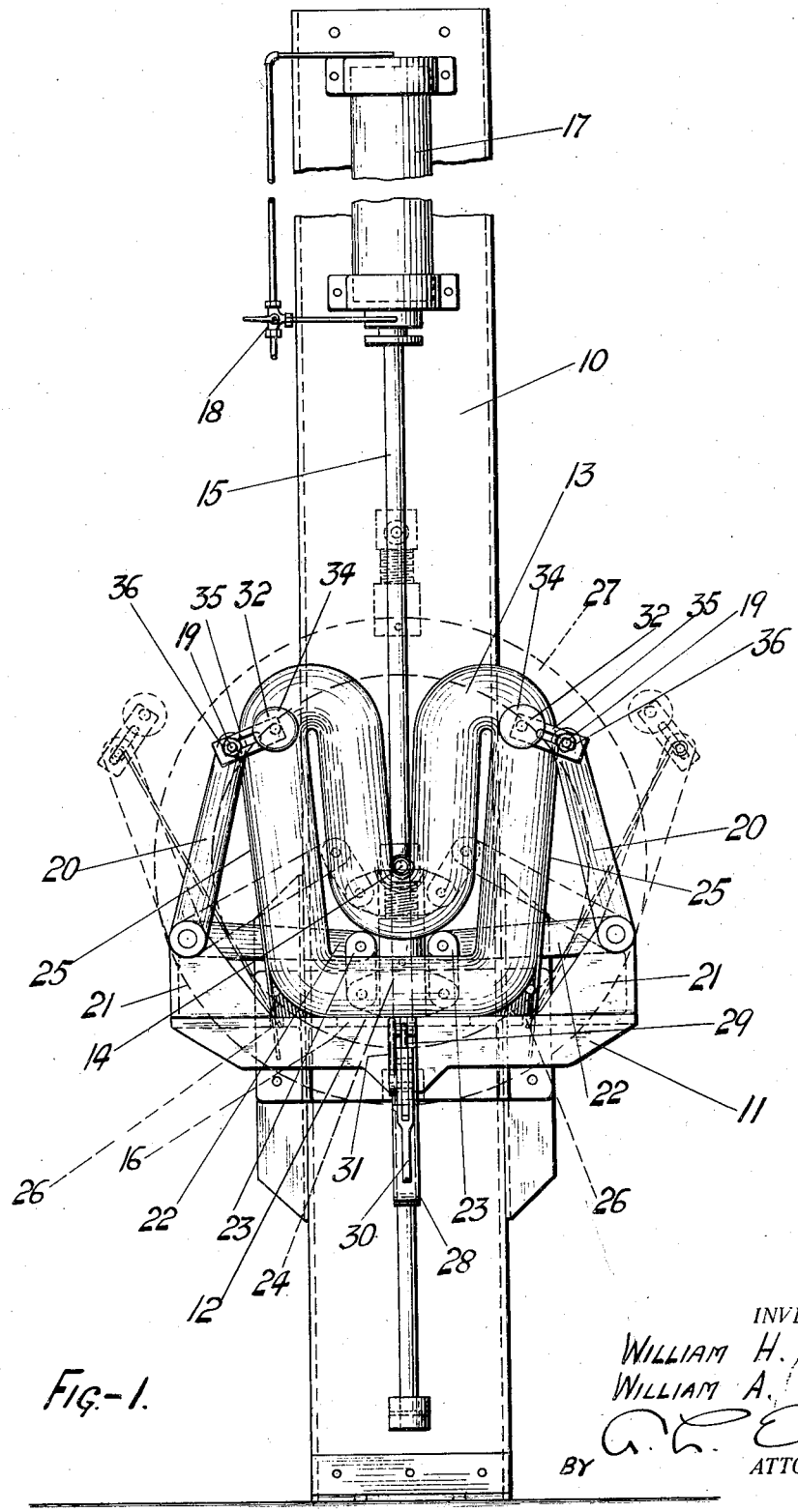

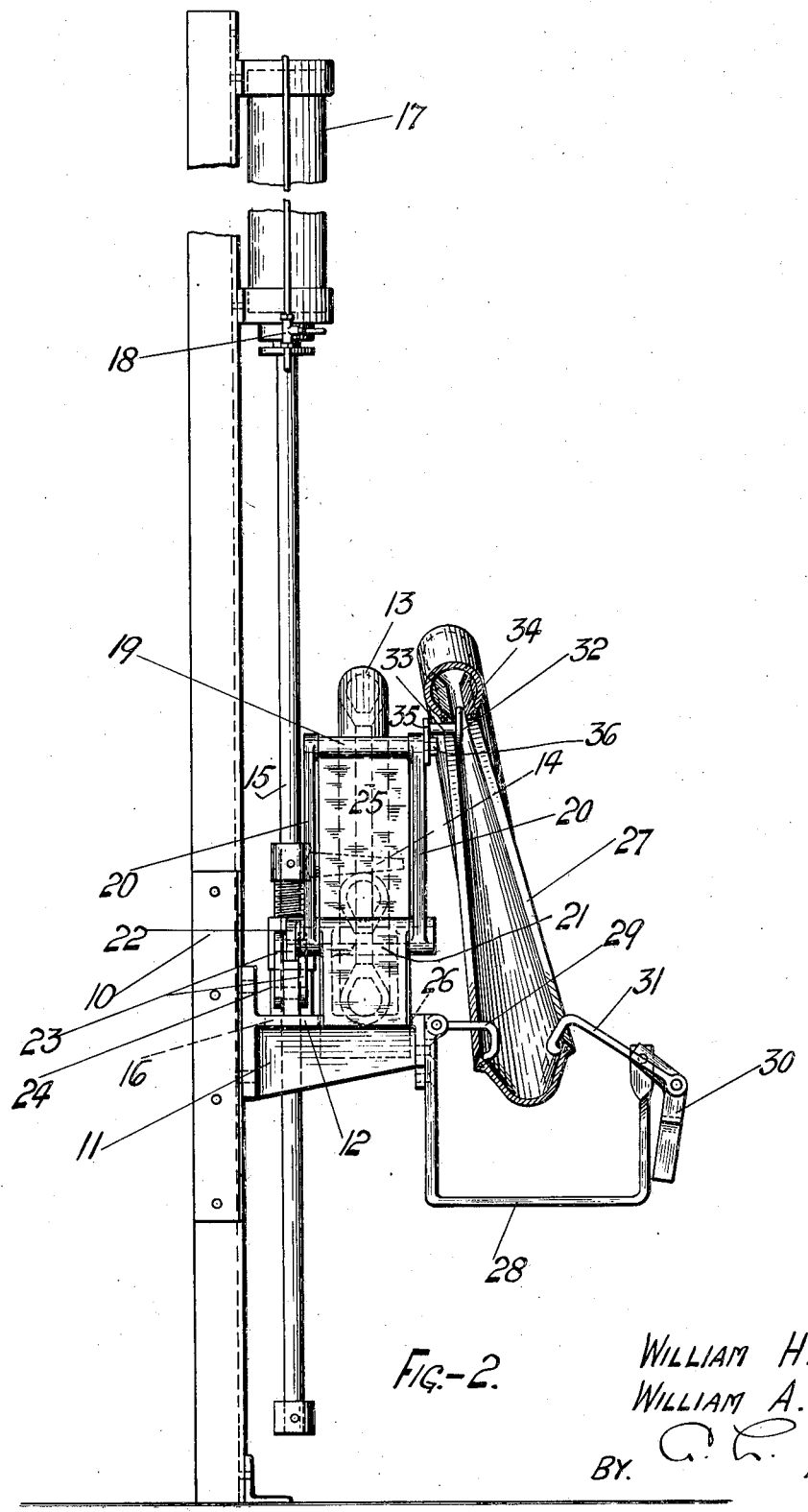

1,759,681

UNITED STATES PATENT OFFICE

WILLIAM H. BINES, OF AKRON, AND WILLIAM A. CORLETT, OF KENMORE, OHIO, ASSIGNORS TO THE FIRESTONE TIRE AND RUBBER COMPANY, OF AKRON, OHIO, A CORPORATION OF OHIO

DEVICE FOR INSERTING AIR BAGS IN TIRES

Application filed December 4, 1924. Serial No. 753,847.

This invention relates to apparatus used for preparing tires for vulcanization and particularly for use in inserting air or other pressure bags into tires to be expanded therein when the latter are vulcanized in molds to cure the tires with their plies under tension and to force them against the mold surfaces.

Heretofore, in preparing cord tires for vulcanization, the non-vulcanized casings have had pressure bags inserted therein by hand. These pressure bags are usually of gum or fabric and gum and have comparatively thick walls so as to render them very stiff. The outer circumferences of the bags which are shaped to fit the inner surfaces of the casings are, of course, considerably greater than the circumferences of the tires at the beads which latter are usually inextensible. Hence the pressure bags have necessarily been collapsed or "broken" so as to be inserted into the tires. The air-bag breaking operation has, so far as is known, been performed by hand. It has accordingly been an exceedingly difficult operation requiring a large number of laborers of great strength and consuming a great deal of time.

It is the purpose of the invention, in general, to provide an apparatus for collapsing pressure bags to facilitate their rapid and easy insertion into the tires without the use of a large number of operatives and at a consequently great reduction in expense.

One object of the invention, in particular, is to provide a series of presser members adapted to be urged against the peripheries of the bags and inwardly thereof to collapse them in such manner that their overall diameters in collapsed condition will be about that of the tire beads.

Another object is to provide one presser member adapted to "break" the bag at one place and cooperating presser members adapted to urge the portions of the bag on either side of the break towards each other to collapse the bag further.

Another object of the invention is to provide a tire casing spreader in combination with the collapsing mechanism whereby a tire may be spread in a position to readily receive the bag as the latter is drawn thereinto from the collapsing device.

The foregoing and other more particular objects will become more apparent when the following detailed description is read in connection with the accompanying drawings, it being understood that the invention is not limited to the specific construction shown and described.

Of the accompanying drawings:

Figure 1 is a front elevation of a machine embodying the invention; and

Figure 2 is a side elevation thereof.

Referring to the drawings, 10 is a suitable supporting bracket adapted to be attached to a wall or strut and supported on its lower end on the floor of the building in which it is installed. Secured on the bracket 10, a short distance from the floor is a second bracket 11 formed with a shelf 12 adapted to support an air bag, indicated at 13, in position to be collapsed.

Movable toward and from the shelf 12 so as to engage and "break" the air bag 13, is a presser element 14 formed substantially as a pin and secured so as to extend laterally therefrom on a reciprocable rod 15 arranged to reciprocate through an aperture 16 in the shelf 12 and adapted to be operated in any suitable manner as by an air cylinder 17 mounted on the upper end of bracket 10 and controlled, as will be understood, by any suitable valve 18 to urge rod 15 either toward or from shelf 12.

As the bag is "broken" and formed in substantially heart-shape by the element 15 it is desirable in order to further collapse the bag that the portions on each side of the break be urged toward each other. To this end a pair of presser elements 19, 19 are arranged to move toward or from each other sidewise of the shelf 12 by being mounted on the ends of levers 20, 20 pivoted on brackets 21, 21 on shelf 12 and adapted to be operated simultaneously toward and from each other as the presser element 14 descends by arms 22, 22 connected by links 23, 23 to a collar 24 secured on rod 15. Aperture 16 is of such size that collar 24 may pass through shelf 12.

In order to confine the bag 13 between the presser elements 19 and the shelf 12 to prevent expansion of the bag in the portions between these points, a pair of comparatively stiff pressure plates 25, 25 are pivoted onto the elements 19 and are arranged so that their free ends will slide back and forth in slots 26, 26 in the shelf 12.

Devices are provided for supporting a tire indicated at 27 in proper relation preferably eccentrically, or in this instance, slightly lower than the bag, to receive the collapsed bag 13, and also for spreading the tire to facilitate insertion of the bag. The devices include a tire-spreader comprising a U-shaped bracket 28 secured at the center of the front edge of shelf 12 and having pivoted on the inner arm of the U, a hook 29 and on the outer arm of the U, a bent lever 30 having pivoted at the bend therein a hook 31, the latter being thus operable to spread the tire in the manner illustrated in Figure 2. For supporting the tire in substantially an upright position levers 20 carry tire bead engaging members 32, 32 formed with portions 33 on which the bead is adapted to seat and a disc portion 34 adapted to extend within the tire and to retain the latter on the portion 33. The members 32 are secured on slotted plates 35 adapted to be adjustably bolted by nuts 36, 36 onto arms 20.

In operation, the bags 13 are successively mounted on shelf 12 while the parts are in the dotted line positions shown in Figure 1. Tires 27 are successively mounted on elements 32 and spread at their lower portions by hooks 29 and 31. Rod 15 is then reciprocated, thus causing element 14 to engage and "break" the bags and elements 19 to collapse the portions on each side of the break towards each other, plates 25 confining the bag between elements 19 and the shelf 12, the latter, of course, confining the lower portions of the bags.

When the bag is collapsed substantially to the position shown in Figure 1, the lower portion of the bag 13 is engaged, as by a hook-shaped tool (not shown) and pulled from shelf 12 into the lower spread portion of the casing 27 (Figure 2). This operation is such that, as will be evident, the lower portion of the bag will be lowered in going into the casing. Accordingly, the element 14 will be urged further downwardly by air pressure in cylinder 17 and will facilitate the completion of the inserting operation which consists in manually engaging and spreading the upper portion of the tire on elements 32 and drawing the bag from beneath the presser element 14 and from between elements 19 and 25 so that it will expand outwardly into the tire. The tire containing the air bag is then removed from the spreader and supports 32.

Modifications of the invention may be resorted to without departing from the spirit thereof or the scope of the appended claims.

What we claim is:

1. Apparatus of the class described comprising a pair of presser elements relatively movable toward and from each other and adapted to receive a pressure bag therebetween, and a second pair of presser elements movable toward and from each other substantially at right angles to the first pair, and presser plates spanning each element of the second pair and one element of the first pair.

2. Apparatus of the class described comprising a plurality of presser elements relatively movable together or apart to collapse a pressure bag therebetween, and a presser plate spanning two of said elements and arranged to slide relatively to at least one of said elements.

3. Apparatus of the class described comprising a support for receiving a pressure bag, a presser element movable toward and from the support to break the bag, and presser elements movable into engagement with the bag on either side of the break, and means for simultaneously operating the presser elements, said means including a reciprocable rod, bell-crank levers carrying the second elements, and links connecting the bell-crank levers to the rod.

4. Apparatus of the class described, comprising three presser elements movable together or apart, and means for operating the elements including a reciprocable rod directly connected to one element, and links connected to bell-crank levers carrying the other elements.

5. Apparatus of the class described comprising a support for receiving a pressure bag, a presser element movable toward and from the support to break the bag, presser elements movable into engagement with the bag on either side of the break, and presser plates spanning the last mentioned elements and the support.

6. Apparatus of the class described comprising a support for receiving a pressure bag, a presser element movable toward and from the support to break the bag, presser elements movable into engagement with the bag on either side of the break, and presser plates spanning the last mentioned elements and the support, said plate being movable relatively to the support.

7. Apparatus of the class described comprising a support for receiving a pressure bag, a presser element movable toward and from the support to break the bag, presser elements movable into engagement with the bag on either side of the break, and presser plates spanning the last mentioned elements and the support, said plates being pivoted on said last mentioned elements and slidable through apertures in the support.

8. Apparatus comprising, in combination, means for collapsing a pressure bag, and a tire spreader.

9. Apparatus comprising, in combination, means for collapsing a pressure bag, means for supporting a tire to receive the collapsed bag, and a tire spreader.

10. Apparatus of the class described comprising means for collapsing a pressure bag, means thereon for supporting a tire to receive the collapsed bag, and a tire spreader.

11. Apparatus of the class described comprising means for collapsing a pressure bag including a pair of levers, and means for supporting a tire in position to receive the collapsed bag, said means including elements mounted on said levers.

12. Apparatus of the class described comprising means for collapsing a pressure bag including a pair of levers, and means for supporting a tire in position to receive the collapsed bag, said means including elements mounted on said levers, and a tire spreader.

13. Apparatus of the class described comprising means for collapsing a pressure bag, means for suspending a tire in position to receive the collapsed bag, and a device for spreading the beads at the lower portion of the tire.

14. Apparatus of the class described comprising means for supporting a pressure bag, means for collapsing the bag, means for supporting a tire, and means for spreading the tire adjacent the bag supporting means so as to receive the bag therefrom.

15. Apparatus comprising means for supporting a pressure bag, means for supporting a tire with one portion below the first supporting means, a device for spreading said portion of the tire, and means for collapsing the bag on the first supporting means.

16. Apparatus of the class described comprising means including a plurality of elements for collapsing a pressure bag, and means for supporting a tire in a position eccentric to a bag collapsed by said means so that one portion of the collapsed bag may be drawn inwardly of the "eye" of the tire and then permitted to expand thereinto.

17. Apparatus of the class described comprising means including a plurality of elements for collapsing a pressure bag, and means for supporting a tire in a position eccentric to a bag collapsed by said means so that one portion of the collapsed bag may be drawn inwardly of the "eye" of the tire and then permitted to expand thereinto, one of said collapsing elements being arranged to follow up the movement of the inserted portion to permit the remainder of the bag being drawn inwardly of the eye of the tire and expanded thereinto.

18. Apparatus of the class described comprising means including a plurality of elements for collapsing a pressure bag, and means for supporting a tire in a position eccentric to a bag collapsed by said means, and means for spreading one portion of the tire so that an adjacent portion of the collapsed bag may be drawn inwardly of the "eye" of the tire and then permitted to expand thereinto.

19. Apparatus of the class described comprising means for collapsing a pressure bag, and means for supporting a tire in position to receive the collapsed bag from the first means, said means being adapted to engage one bead of the tire so that the other can be spread away therefrom to receive the bag.

20. Apparatus of the class described comprising means for receiving and collapsing a pressure bag in one plane, and means for supporting a tire to receive the bag in an adjacent substantially parallel plane, said means being arranged to position the bag and the tire eccentrically of each other.

WILLIAM H. BINES.
WILLIAM A. CORLETT.